C. W. GREGORY.
CHAIN.
APPLICATION FILED DEC. 18, 1919.
1,396,701.
Patented Nov. 8, 1921.
3 SHEETS—SHEET 1.
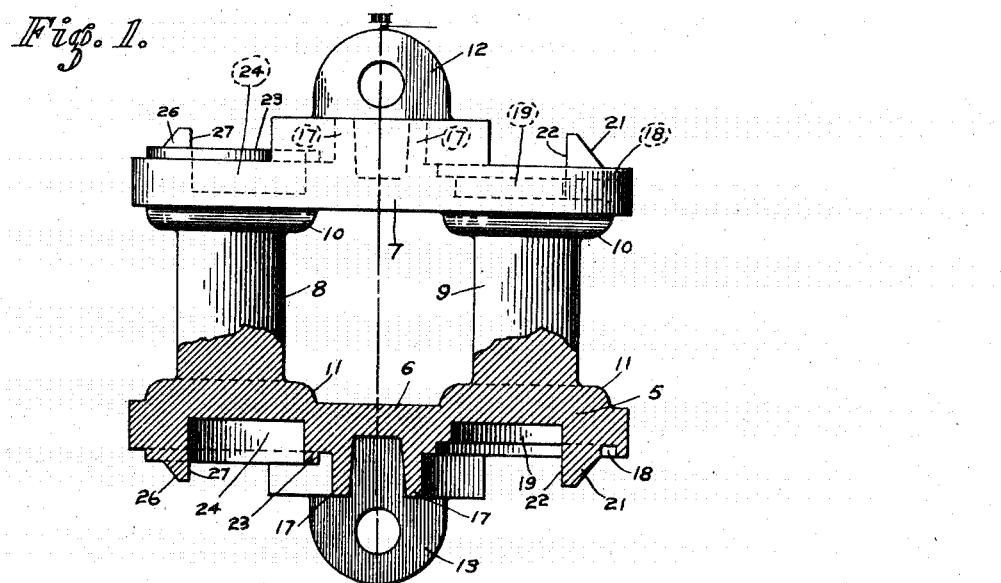
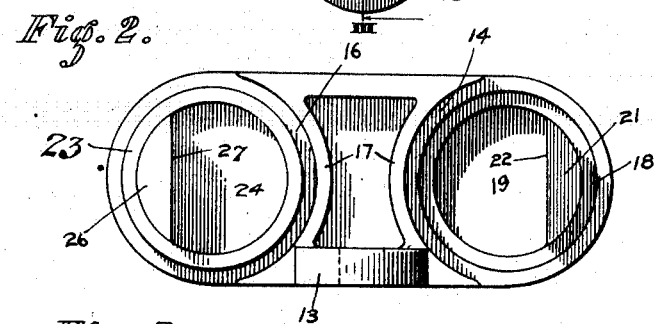
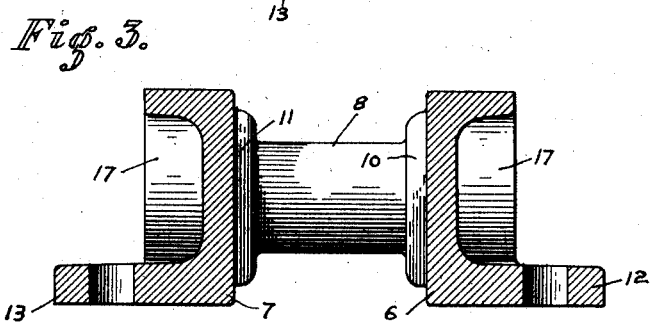
Inventor
CARL W. GREGORY
By Bradley L. Benson
Atty.

C. W. GREGORY.
CHAIN.
APPLICATION FILED DEC. 18, 1919.
1,396,701.
Patented Nov. 8, 1921.
3 SHEETS—SHEET 2.
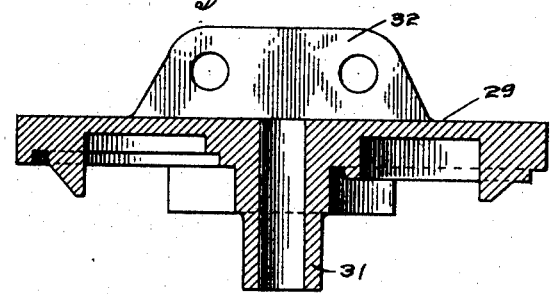
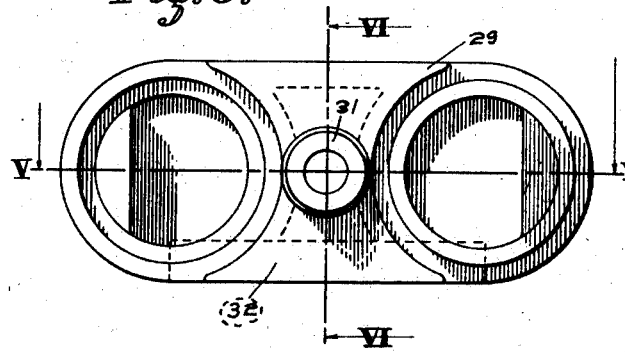
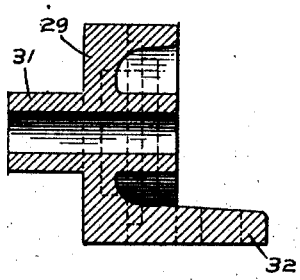
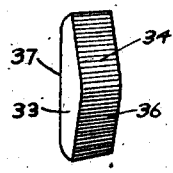
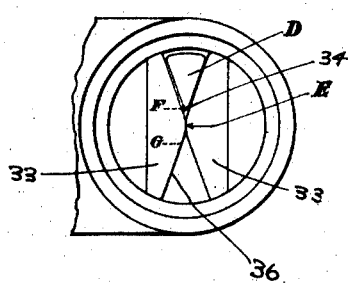
Inventor
CARL W. GREGORY
By Bradley L. Benson
Atty.

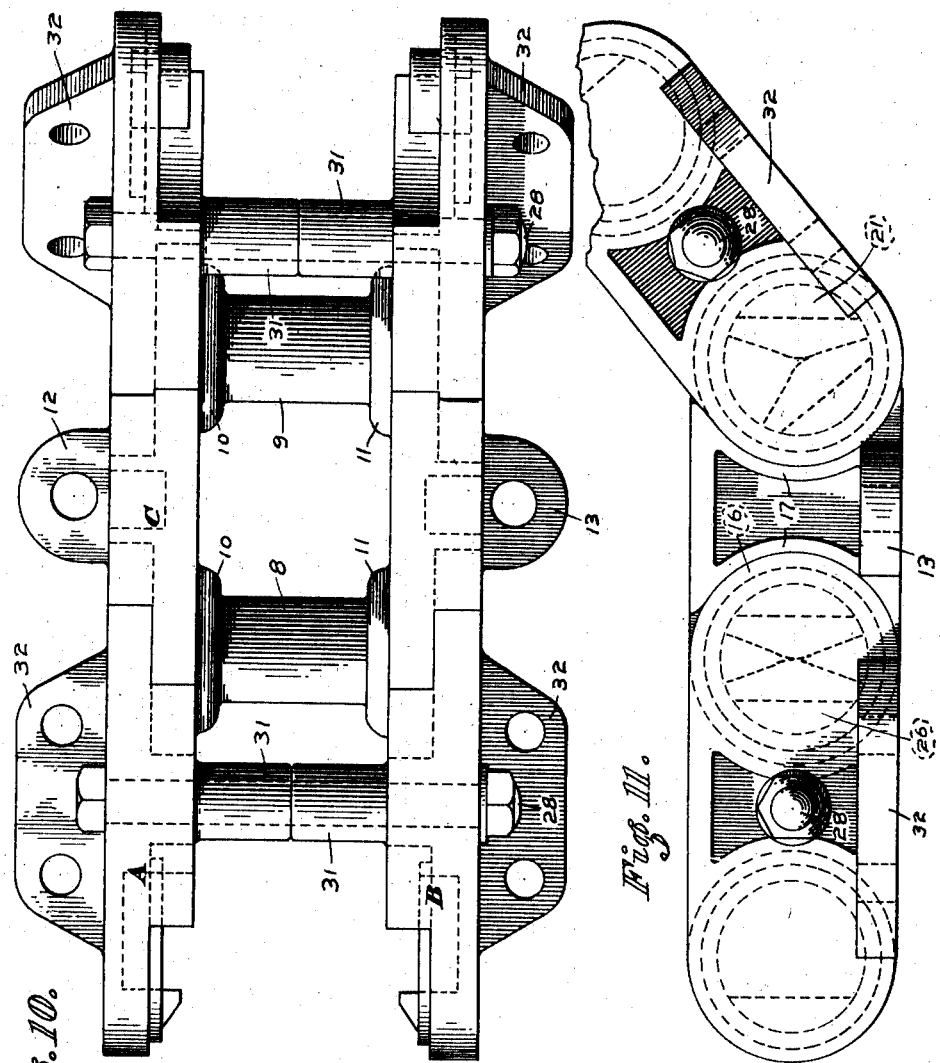

UNITED STATES PATENT OFFICE.

CARL W. GREGORY, OF PETALUMA, CALIFORNIA.

CHAIN.

1,396,701.  Specification of Letters Patent.  Patented Nov. 8, 1921.

Application filed December 18, 1919. Serial No. 345,870.

*To all whom it may concern:*

Be it known that I, CARL W. GREGORY, a citizen of the United States, residing at Petaluma, in the county of Sonoma and State of California, have invented certain new and useful Improvements in Chains, of which the following is a specification.

This invention relates to a new, novel and useful improvement in chains adapted to be used upon tractors.

It is obvious, however, that chains formed of links of a similar design might be employed in many places wherein a chain of considerable strength is necessary.

One of the principal objects of this invention is to construct a chain having links which when associated will form a chain which may be flexed, and at the same time to reduce the wear incident to flexing to a minimum.

Another object of this invention is to contruct a chain in such a manner that the principal wearing points may be renewed at a nominal price without the necessity of inserting entirely new links in place of the worn ones, as is now common practice.

Another object of the invention is to construct the chain in such a manner that the same may be easily manufactured and without the necessity of expensive machining.

Other objects and advantages of this invention will be seen in the detailed description which now follows.

In this specification and the annexed drawings, the invention is illustrated in the form considered to be the best, but it is to be understood that the invention is not limited to such form, because it may be embodied in other forms, and it is also to be understood that in and by the claims following the description it is desired to cover the invention in whatsoever form it may be embodied.

In the drawings:—

Figure 1 as a top plan view partly in cross section of a master link.

Fig. 2 is a side elevation of Fig. 1.

Fig. 3 is a cross section of Fig. 1 taken on the line III—III.

Fig. 4 is a cross section of one half of a connector link taken on the line V—V of Fig. 5.

Fig. 5 is a side elevation of the connector link section shown in Fig. 4.

Fig. 6 is a cross section taken on the line VI—VI of Fig. 5.

Fig. 7 is a perspective view of a wear block.

Fig. 8 is a perspective view of a limiting wedge.

Fig. 9 is a diagrammatic view of the relative position of the wear blocks and the relative position that the wedge shown in Fig. 8 will take when the links are in a horizontal position.

Fig. 10 is a top plan view of a master link and two connector links, one link being turned on the pivot.

Fig. 11 is a side elevation of the links shown in Fig. 10.

Referring to the drawings in detail, like numerals correspond to similar parts in the several views. Referring to Fig. 1, the numeral 5 designates a casting having two parallel portions 6 and 7 connected by parallel cylindrical portions 8 and 9. Bosses 10 and 11 are formed on the portions 8 and 9 to further strengthen the structure. Outwardly extending lugs 12 and 13 are formed upon one edge of the parallel portions 6 and 7. These lugs form means for attaching road shoes thereto. The outer surfaces of the parallel portions 6 and 7 are cut away, as best shown at 14 and 16 Fig. 2, which cutting away forms arcuate shaped portions 17. One end of the link has its outer surfaces cut away to form annular depressed rings 18, within which are formed depressions 19 and upstanding lugs 21. These upstanding lugs each have a forward face, as shown at 22. The opposite end of the link is formed so as to have upstanding rings 23 within which depressions 24 are formed and upstanding lugs 26. The lugs 26 each have a vertical face 27, which faces are parallel to the vertical faces 22 of the lugs 21.

Referring now to Fig. 10, it will be noted that the connector link is made of two sections A and B bolted together by a bolt 28. These sections A and B are similar to that shown in a cross section on Fig. 4, each section having a horizontal portion 29 and a tubular portion 31. A lug 32 is formed upon each section and is similar to the lugs 12 and 13 with the exception that the lugs 32 are broader and permit of a more positive engagement with the ground shoe. The ends of the connector link sections on both sides of the tubular portion 31 are formed similar to the contour just described upon both sides of the master link. It is therefore deemed unnecessary to further describe the same.

The numeral 33 refers to a wear block which has inclined faces 34 and 36 and a vertical face 37. The vertical face 37 is adapted to be brought into contact with the vertical face of the lug 21; it being understood that a wear block is employed with each of the lugs formed upon the master link, and also with each of the lugs formed upon the connector link sections.

In assembling a chain composed of connector links and master links, the operation is as follows:—

A master link is placed as shown in Fig. 10 and indicated by the letter C. Two wear blocks are placed within each depression 24 of the master link in such a manner that one of the wear blocks will have its vertical face against the vertical face 27 of each of the lugs 26. The other wear block will be placed so that it will be opposed to the first wear block, as shown in Fig. 9. Connector link sections similar to Fig. 4 will then be placed so that their portions 29 lie in the same plane as the portions 6 and 7 of the master link. This will bring the projecting lugs of the connector links within the depressions 24, and abutting the vertical faces of the opposed wear blocks. Similar connector links will be placed upon the opposite end of the master link in such a manner that the lugs of the connector links will fall within the depressions 19. Bolts 28 will then be placed through the tubular members 31 of the connector links which will hold the same in proper alinement with the master link. A chain of any length can in this manner be assembled.

If it is desired to prevent the chain from flexing in one direction, or in other words, to make the chain self-supporting when traveling from the top of one sprocket wheel to the top of the next, wedges such as shown in Fig. 8, may be inserted, as shown at D in Fig. 9.

It will thus be seen that I have devised a link which will form a chain when properly assembled having rolling contacts between links, as indicated at E, Fig. 9. The point of contact of the wear blocks will change as one wear block rolls upon the other, which rolling contact will take place between the points indicated by the dotted lines F and G Fig. 9, the contact point changing between the lines F and G as the angle of one link changes with respect to that of the adjacent link. Further, I have devised a means whereby the rolling wearing points of contact may be easily removed and replaced without the necessity of entirely renewing the chain.
It is obvious that the degree of flexiblity of the chain is determined by the angle of the faces 34 and 36 of the wearing blocks.

Having thus described my invention what I claim as new and desire to secure by Letters Patent of the United States is as follows:—

1. In a chain, the combination of links having overlapping ends, lugs carried by each of said overlapping ends, said lugs having vertical flat faces, wear blocks having vertical faces adapted to abut said lugs and said wear blocks having rolling contact with each other.

2. In a chain, the combination of a master link composed of spaced parallel side members, each end of each side member having a depression therein, the depression at one end of a side member surrounded by a depressed ring, and that at the opposite end by a raised ring, lugs within said rings, each having a flat face, said flat faces parallel to and facing each other, wear blocks adapted to be retained within said depressions and contact with said lugs, said wear blocks having rolling contact with each other, and connector links adapted to coöperatively engage said master link and to abut said wear blocks.

3. In a chain, the combination of a master link, composed of spaced parallel side members, each end of each side member having a depression therein, the depression at one end of a side member surrounded by a depressed ring, and that at the opposite end by raised ring, lugs within said rings each having a flat face, said flat faces parallel to and facing each other, connector link sections composed of side members complementary to and adapted to engage the side members of said master link, each side member of said connector links provided with tubular members integral therewith and projecting toward and registering with each other, and wear blocks adapted to contact with the lug faces of the master and connector links, said wear blocks having rolling contact with each other as the chain flexes.

4. In a chain, the combination of a master link composed of spaced parallel side members, each side member having depressions therein, depressed rings and upstanding rings, surrounding said depressions, lugs within said rings, each lug having a flat face said flat faces parallel to each other, connector links adapted to coöperate with said master link said connector links having lugs, and wear blocks adapted to be interposed between the lugs of the master and connector links, said wear blocks having rolling contact with each other.

In testimony whereof I affix my signature.

CARL W. GREGORY.